June 28, 1960 M. J. RYMLAND 2,942,278
SPRING CUSHION ASSEMBLY EMPLOYING CYLINDRICAL SPRINGS
Filed Aug. 16, 1956 2 Sheets-Sheet 2
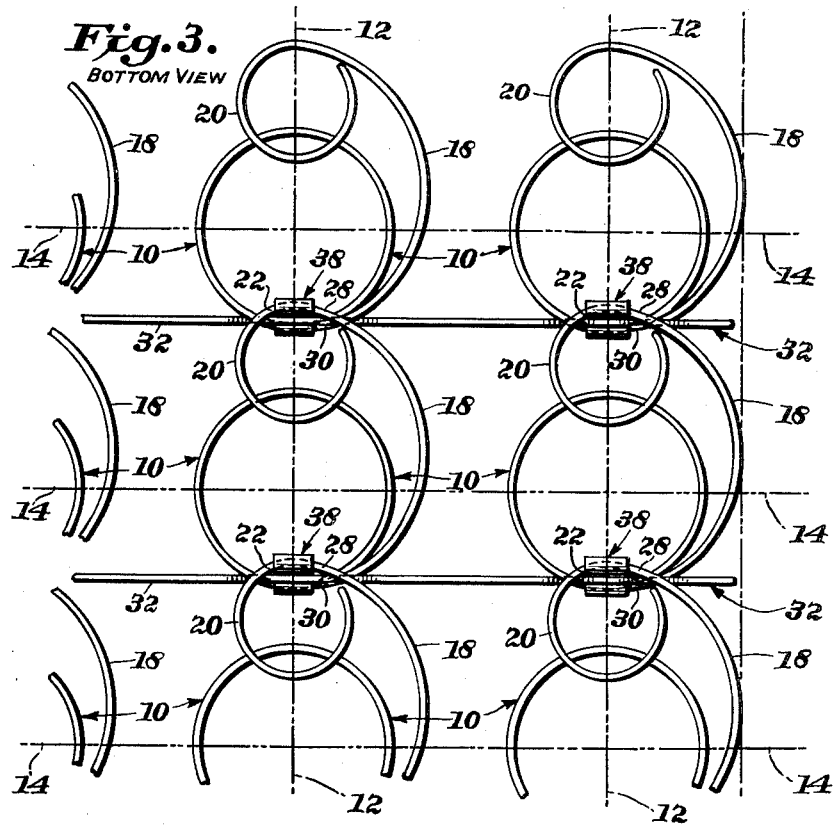
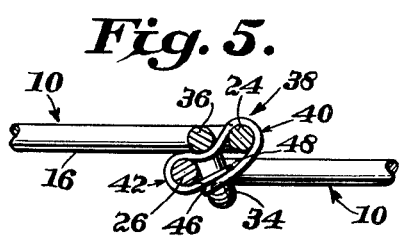
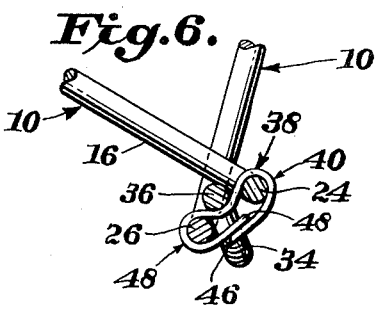
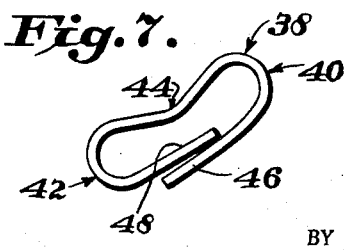
INVENTOR:
Murray J. Rymland,
BY Cushman Darby & Cushman
ATTORNEYS.

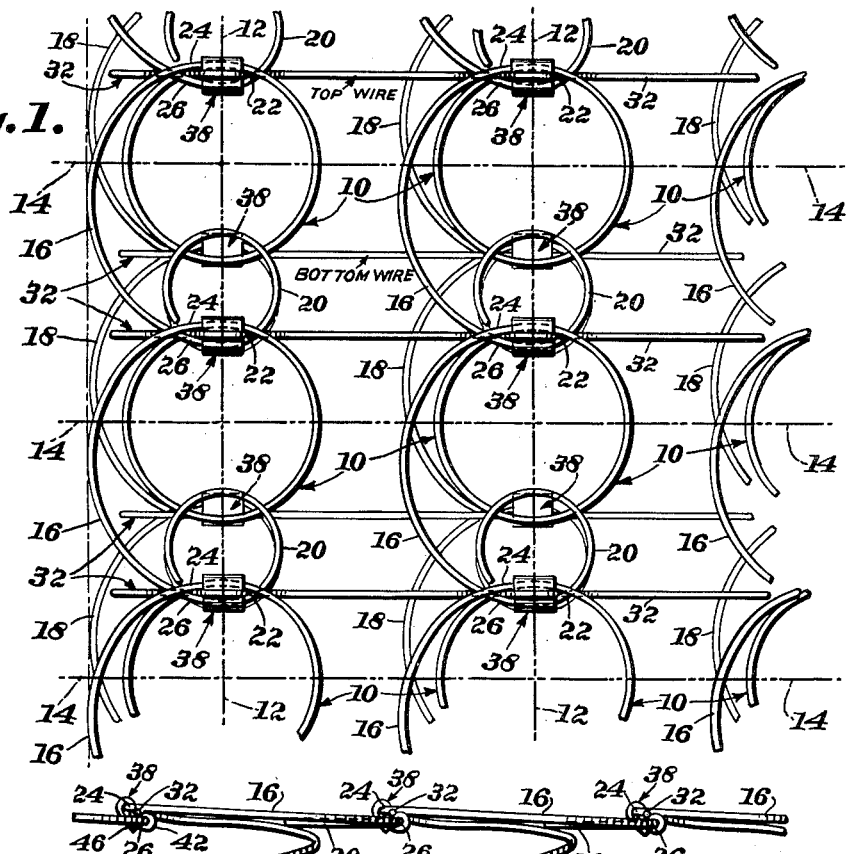
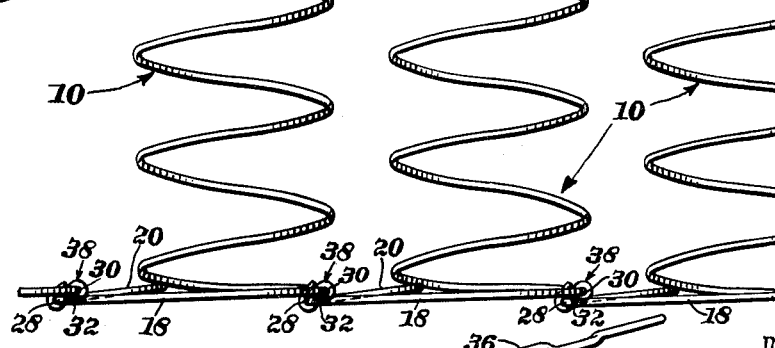

United States Patent Office 2,942,278
Patented June 28, 1960

2,942,278

SPRING CUSHION ASSEMBLY EMPLOYING CYLINDRICAL SPRINGS

Murray Jerome Rymland, % Comfort Spring Corp., Fairmount Ave. and Bethel St., Baltimore 31, Md.

Filed Aug. 16, 1956, Ser. No. 604,381

9 Claims. (Cl. 5—271)

The present invention relates to spring cushion assemblies and more particularly to spring cushion assemblies utilizing cylindrical helical springs, arranged and interconnected in a predetermined space relation.

Cylindrical helical springs, that is, springs in which all of the convolutions thereof are of substantially the same diameter defining a cylindrical outline, are particularly desirable in spring cushion assemblies because of their numerous advantages over other types of helical springs. Cylindrical helical springs are comparatively inexpensive to manufacture inasmuch as each convolution is formed of the same diameter, and therefore it is not necessary that the ends of the wire for each spring be connected or secured to any other part of the spring, as is done in other types of helical springs where the end convolutions are of a different diameter than the intermediate convolutions.

Additionally, once the cylindrical helical spring is formed in the conventional manner, there are no distorting residual stresses set up in the individual spring convolutions such as those created in other helical springs. Consequently, the heat treating or annealing operation usually performed in the manufacture of other types of springs to remove such stresses is omitted in producing cylindrical springs.

Besides being less expensive to manufacture, cylindrical springs possess superior physical properties when used in spring cushion assemblies, as is well understood in the art. One of the more important of these properties is that such springs are relatively strong so that they may be made of thin wire to assure an extremely comfortable and soft spring assembly while possessing sufficient strength and resiliency to prevent permanent loss of shape or unattractive distortions during use.

Numerous attempts have been made in the past to utilize cylindrical helical springs in spring cushion assemblies. For example, one well-known type of spring cushion assembly involves the disposition of cylindrical helical springs in a cellular-like structure having individual pockets of fabric or the like wherein the springs are not interconnected, but are spaced very close together in these pockets to define rows and files. That is, each spring substantially completely fills its respective pocket with the convolutions thereof contacting the side walls of the pocket.

Such spring cushion assemblies have several disadvantages. The fabric side walls often become frayed by the rubbing of the spring convolutions thereagainst during use and eventually the spring convolutions pierce these side walls and become interlocked and overlapped with convolutions of adjacent springs. When this occurs, the overlapped spring convolutions cause undesirable rubbing or squeeking noises and furthermore, the spring assembly may lose its original shape and become "lumpy" and uncomfortable.

Additionally, spring assemblies constructed in this manner are quite expensive inasmuch as the springs are very closely spaced, requiring the use of a comparatively large number of springs to construct a spring cushion assembly of any predetermined size. In other words, the individual convolutions of each spring are positioned immediately adjacent the convolutions of adjacent springs, resulting in a maximum number of springs for an assembly of any given size. Due to the equality of size of the convolutions in cylindrical helical springs, it has hitherto been found impracticable to interconnect the end convolutions of such springs in economically spaced relation in rows and files to define a spring cushion assembly.

Accordingly, it is a principal object of this invention to overcome the foregoing and other disadvantages of the prior art by providing a novel arrangement of cylindrical helical springs, disposed in rows and files, to define a simplified, durable and inexpensive cushion assembly. In a preferred embodiment, this is accomplished by spacing the individual springs a desired distance from each other and extending the end convolutions of each spring into overlapping relationship with corresponding end convolutions of adjacent springs in the same row. In this manner, lines of overlap, extending transversely of the rows, are presented for facilitating interconnection of the springs along such lines.

Another object is to provide a novel arrangement of cylindrical helical springs particularly adapted to be interconnected in rows and files by means of any of the methods and structures defined in my prior Patent 2,630,-586, granted March 10, 1953, and my copending applications Serial Nos. 384,874, filed October 8, 1953, now Patent No. 2,791,783; 495,309, filed March 18, 1955, now Patent No. 2,857,603; 596,589, filed July 9, 1956; and 596,590, filed July 9, 1956.

A further object is to provide a spring cushion assembly, constructed of cylindrical helical springs, possessing superior qualities of softness and comfort yet being effective to transmit downward pressures noiselessly and proportionally to other springs in the assembly.

An additional object is to provide spring cushion assemblies of the type under consideration which are readily foldable to facilitate transport and storage thereof and to permit them to be used in collapsible or convertible furniture.

Further objects of the invention will be in part obvious and in part pointed out hereinafter.

The invention, and novel features thereof, may best be made clear from the following description and the accompanying drawings in which:

Figure 1 is a fragmentary, top plan view of a spring cushion assembly of the invention;

Figure 2 is a fragmentary, end elevational view of the assembly of Figure 1, as viewed from left to right in Figure 1;

Figure 3 is a fragmentary, bottom plan view of the spring assembly of Figure 1;

Figure 4 is a perspective view of an exemplary form of tie wire used in interconnecting the springs of the assembly;

Figure 5 is an enlarged, fragmentary, sectional view of overlapping portions of interconnected end convolutions of the springs, showing the manner in which a clip and tie wire are arranged therewith;

Figure 6 is a view corresponding to Figure 5 but showing the overlapping convolution portions in a displaced or pivoted position, and Figure 7 is an enlarged, end elevational view of an exemplary form of clip used in this invention.

Referring to the drawings in detail, a spring cushion assembly of the invention comprises a plurality of component cylindrical helical springs 10 constructed of wire in a conventional manner. These springs are arranged in spaced relationship to define rows 12 and files 14 wherein the axes of the springs are in parallelism.

In the preferred form of my invention, each spring 10 is formed with the top and bottom end convolutions deformed radially outwardly of their normal positions to define upper and lower arcuate portions 16, 18 respectively and extending through approximately 180° as best seen in Figures 1 and 3. Preferably, the end of the wire in each projecting portion 16, 18 is bent into a generally circular loop 20. These loops 20 and the portions 16, 18 may be formed by any suitable means and the upper and lower loops 20 on each spring preferably are arranged in diametrically opposed relation in general alignment with the axis of the respective rows 12, extending radially outwardly of the intermediate convolutions integral therewith. The radially outermost portions of loops 20 are placed in overlapping relationship with a corresponding end convolution of an adjacent spring in the same row so as to space the intermediate convolutions from each other while defining regions of overlap 22 (see Figures 1 and 3). Each upper region of overlap 22 may be defined by an overlying arcuate portion 24 of an undeformed part of the spring and an underlying arcuate portion 26 of the loops 20. In other words, the loop 20 on the upper end convolution of each spring may be disposed beneath that portion of a corresponding end convolution which is disposed at the same radial distance from the center of its spring axis as its associated intermediate convolutions; while the loops 20 on the lower end convolution of each spring may be arranged with an arcuate portion 28 thereof overlying an arcuate portion 30 of the end convolution associated therewith. It should be noted, however, that the loops 20 of the upper and lower end convolutions may both overlie or underlie the corresponding end convolutions of adjacent springs in the same row, or the upper loop may overlie and the lower loop underlie the corresponding end convolutions.

The regions of overlap 22 in each row are aligned with corresponding regions of overlap in the other rows so as to define lines of overlap extending transversely of the rows and between the files. In this connection, it will be observed that with loops 20 on each spring being in diametrically opposed relation, the lines of overlap for the upper end convolutions of adjacent files of springs will be horizontally spaced longitudinally of the rows from the corresponding and parallel lines of overlap of the lower end convolutions, as seen in Figures 1 and 2. The springs 10 in each row usually are equally spaced a desired distance from corresponding springs in adjacent rows and to permanently secure them in this desired relationship, a plurality of tie wires 32 (see Figure 4) are utilized, these tie wires preferably being either the type illustrated in my prior Patent No. 2,630,586 or in my copending application, Serial No. 495,309, now Patent No. 2,857,603. These tie wires are positioned tranversely of the rows along the lines of overlap between the springs and include a plurality of pairs of spaced depressions 34 separated by an upwardly projecting insert 36. As is explained in the above patent and application, the depressions 34 partially embrace the overlapped portions of the end convolutions at the points of intersection thereof with the insert 36 projecting into the region of overlap 22. It will be obvious to those skilled in the art, as the description proceeds, that the tie wires 32 may have any convenient cross-sectional configuration including or excluding the spaced depressions 34 and inserts 36 or they may be made of a plurality of spun or twisted wire strands to constitute a flexible cable.

In interconnecting the tie wires 32 to the end convolutions of the springs to produce a spring cushion assembly any of the methods and structures may be used which are described in either of the last-named patent and copending application or in any of my other copending applications, namely Serial No. 384,874, now Patent No. 2,791,783, Serial No. 596,589 or Serial No. 596,590. Additionally, the method and structure disclosed in the latter two copending applications for interconnecting the laterally outermost portions of end convolutions of the springs in border files, preferably are utilized for the border files of the cylindrical springs of the present invention, although this structure is not shown. In this regard, it will be understood that the projecting portions and loops 20 of the upper and lower end convolutions of the springs in the border files, which would normally project laterally outwardly of the spring assembly, beyond their associated intermediate convolutions, may be omitted. That is, the loop 20 and portions 16 and 18 in the border files which would not normally be interconnected with other springs in the same rows, may be omitted. This will prevent any undesirable projections or bulges in these regions when a fabric or the like covering is placed over the assembly. In some cases, it may be desirable to omit the border structure entirely or to employ other types of border structures.

Preferably, the tie wires 32 are interconnected with the overlapped portions of corresponding end convolutions of the springs by means of clips or clamp members 38 similar to the clips described in my copending application Serial No. 596,590. This clip structure is illustrated in Figures 5–7 and includes transversely spaced arcuate portions 40, 42, defining longitudinal grooves in the clip adapted to receive the overlapping arcuate portions of corresponding end convolutions of adjacent springs. The clip 38 further comprises a depressed portion 44, joining the spaced portions 40, 42. Clip portions 40, 42 terminate in overlapping free ends 46, 48 respectively. As is described in the last-named application, the clip 38 is arranged with the arcuate portions 40, 42 somewhat loosely embracing the overlapped portions of the corresponding end convolutions with the clip depression 44 underlying the tie wire insert 36 whereby a hinge-type interconnection for adjacent files of springs is provided so that the end convolutions of the springs in one file may be pivoted or swung with respect to corresponding end convolutions of the springs in an adjacent file, as shown in Figures 5 and 6. By reason of this construction, the spring cushion assembly may be collapsed or folded in any desirable manner, whereby transport and storage of such assemblies will be facilitated and furthermore, they may be readily used in collapsible or convertible furniture.

Since the projecting portions 16, 18 of each cylindrical spring end convolution are not connected or secured to an intermediate convolution integral therewith, as are other types of springs, these portions constitute a type of cantilever structure or spring arm at the upper and lower ends of the springs 10. Consequently, when forces are applied in the region of these portions, the latter will offer little resistance to these forces even though such portions are interconnected to other end convolutions, so that inward displacement of the spring assembly will readily occur. By virtue of this feature of the invention, the overall softness and comfort inherent in spring assemblies constructed of cylindrical springs, will be greatly enhanced. Additionally, since the size of the projecting portions 16, 18 may easily be varied, they allow a highly economical spacing of the individual springs in any given size spring assembly; while the cooperation of these portions 16, 18 with the interconnected tie wires 32 and clip 38 serves to endow the assembly with superior qualities of strength, resiliency, and pressure distribution. In connection with this latter aspect, namely that of pressure distribution, it will be understood that downward or inward forces exerted on any region in the assembly will be transmitted through the interconnected tie wires to other springs in a similar manner to that described in my prior Patent 2,630,586, whereby deflection or distortion of the individual springs for any given load will be reduced.

It has been found in practice that by extending the loops 20 of portions 16, 18 rearwardly, that is, reversely bending such portions to a position radially inwardly of the intermediate convolutions integral therewith, as best shown in Figures 1 and 3, inward displacement of the portions 16, 18 will be resisted by such intermediate convolutions after said portions have been displaced to a position wherein the loops 20 will strike or contact the adjacent integral intermediate convolution. In other words, since the loops have a part extending radially inwardly of the intermediate convolutions integral therewith, this part will contact the adjacent intermediate convolution when inward forces displace the projecting portions 16, 18 inwardly a sufficient distance and consequently, further displacement of the projecting portions will be resisted by the remaining convolutions of the spring and the action of the force will be more effectively transmitted or distributed to the remaining integral spring convolutions. While the loops 20 are preferably formed in this manner and thereby prevent extreme deflections of arcuate portions 16, 18 when great loads or body weights are applied thereto, the loops, in certain types of spring assemblies, may be arranged to lie wholly without the cylinder defined by the intermediate convolutions integral therewith without any danger of rupture or failure in these areas.

In any event, it will be seen that the projecting portions 16, 18 of the springs 10 enable superior spring cushion assemblies to be readily and inexpensively constructed of cylindrical helical springs in the manner comprehended herein.

The opening defined by each of the loops 20 preferably is of a sufficient size to permit the insertion of one of the jaws of a clinching or clamping tool (not shown) for clinching the free ends 46, 48 of the clips 38 in the manner described in my copending application Serial No. 596,589, mentioned above. In this regard, the ends of the projecting arcuate portions 16, 18 may be formed, if desired, into any shape or configuration which can be overlapped with a corresponding end convolution of an adjacent spring for interconnection therewith without impairing the operation of a clinching tool for the clips 38. Moreover, the projecting portions 16, 18 and loops 20 of each spring may be arranged in direct alignment, one above the other, rather than with the loops disposed in diametrically opposed relation.

It should be evident that the projecting portions 16, 18 on the end convolutions need not be arcuate, but may be formed as a generally straight line extending tangentially from an undeformed part of the end convolution, for example, they may extend tangentially from a point approximately 90° counterclockwise of the position of the clips 38, as viewed in Figure 1, to the looped end. Other modifications of the conformation of portions 16, 18 and the loops 20, within the scope of the invention, will readily suggest themselves to those skilled in the art.

Other types of tie wires may be used, as indicated above; however, the type disclosed herein is particularly advantageous inasmuch as the straight portions of each of these tie wires, intermediate adjacent rows, are disposed approximately at the same elevation as and lie in substantially the same plane with the overlapped spring end convolutions and other tie wires on the same side of the assembly. By reason of this arrangement, a smooth, flat surface is provided on the top and bottom sides of the assembly to facilitate the attachment of a neat and attractive fabric covering.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A spring cushion assembly comprising a plurality of similar, helical springs arranged to define a plurality of rows and files, said springs having their axes disposed vertically in parallelism, all of the intermediate convolutions of each spring being of substantially the same diameter to define a cylinder, the upper and lower end convolutions of each spring including a projecting portion disposed radially outwardly from the intermediate convolutions integral therewith, the projecting portions of the upper and lower end convolutions of each spring extending substantially equal distances from their respective spring axis in diametrically opposite directions, each projecting convolution portion and an arcuate portion of a corresponding end convolution of an adjacent spring in the same row being arranged in overlapping relationship with the intermediate convolutions of each spring being spaced from the intermediate convolutions of adjacent springs in the same file and row and with the lines of overlap of the upper end convolutions being generally parallel to and horizontally spaced from the corresponding lines of overlap of the lower end convolutions, and hinge means for interconnecting the overlapping end convolutions of adjacent springs in each row to each other and also to corresponding end convolutions of adjacent springs in the same files therewith.

2. The structure defined in claim 1 wherein the interconnecting means includes tie wires and clips, each tie wire extending transversely of the rows of springs along one of the lines of overlap of the end convolutions, and one of the clips being associated with each of the overlapping end convolutions and the corresponding tie wire.

3. The structure defined in claim 2 wherein each of the projecting portions of the end convolutions of the springs includes a loop having a part thereof disposed radially inwardly of the intermediate convolutions integral therewith, and each of said loops defining an opening considerably larger than the dimension of the clips transverse to the rows.

4. The structure defined in claim 1 wherein the hinge means defines a hinge for adjacent files having an axis extending transversely of the rows so that any one of the files may be pivoted bodily, with respect to an adjacent file, about said axis.

5. A spring cushion assembly comprising a plurality of parallel rows and files of spaced, similar helical springs, said springs having their axes arranged in parallelism, all of the intermediate convolutions of each spring being of substantially the same diameter to define a cylinder, one of the end convolutions of each spring including a projecting portion disposed radially outwardly from the associated intermediate convolutions, each of said projecting portions of the end convolutions terminating in a free end and normally spaced out of contact with the adjacent intermediate convolutions of the same spring, and each of said projecting portions of the end convolutions being disposed to define a region of overlap with an adjacent end convolution in the same row, a tie wire extending parallel to and intermediate of adjacent files of springs along said regions of overlap, clips interconnecting the overlapped portions of the end convolutions with said tie wire, the region of overlap defined by any two interconnected convolutions of adjacent springs in the same row being displaced longitudinally of the row from the region of overlap of the opposite end convolutions of these two springs.

6. A spring cushion assembly comprising a plurality of parallel rows and files of spaced, similar helical springs, said springs having their axes arranged in parallelism, all of the intermediate convolutions of each spring being of substantially the same diameter to define a generally circularly cylindrical outline, the end convolutions of each spring including a portion disposed radially outwardly from the associated intermediate convolutions, each of said portions of the end convolutions being in the form of a generally circular loop terminating in a free end and normally spaced out of contact with the adjacent intermediate convolutions of the same spring, and each of said portions of the end convolutions being disposed to define a region of overlap with an arcuate portion of an adjacent end convolution of an adjacent spring in the same row, said arcuate portions of said adjacent end convolutions lying in substantially the same cylindrical outline as the associated intermediate convolutions integral therewith, a tie wire extending parallel to and intermediate of adjacent files of springs along said regions of overlap, and clips interconnecting the overlapped portions of the end convolutions with said tie wire.

7. The structure defined in claim 6 wherein the loops on the end convolutions of each spring are arranged at diametrically opposite points with respect to their associated spring axis.

8. The structure defined in claim 6 wherein each of the portions of the end convolutions in the form of a generally circular loop extends inwardly to a point radially inward of the intermediate convolutions integral therewith.

9. The structure defined in claim 6 wherein the free end of each of said loops is disposed adjacent to the clip engaged to said loop.

References Cited in the file of this patent
UNITED STATES PATENTS

| | | |
|---|---|---|
| 1,433,539 | Frank | Oct. 31, 1922 |
| 1,631,056 | Pepernick | May 31, 1927 |
| 1,868,279 | Ehlenbeck | July 19, 1932 |
| 1,887,058 | Karr | Nov. 8, 1932 |
| 2,052,982 | Levine | Sept. 1, 1936 |
| 2,113,377 | Krakauer | Apr. 15, 1938 |
| 2,320,020 | Wallis | May 25, 1943 |
| 2,514,475 | Collette | July 11, 1950 |
| 2,630,586 | Rymland | Mar. 10, 1953 |

FOREIGN PATENTS

| | | |
|---|---|---|
| 389,357 | Great Britain | July 22, 1932 |